May 7, 1968 H. M. SCHWEIGHOFER ET AL 3,382,351
ROLLOUT GUIDANCE DISPLAY
Filed May 11, 1967 3 Sheets-Sheet 1
FIG. IA
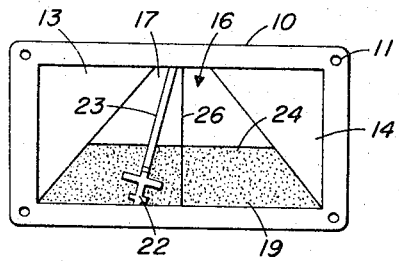
FIG. IB
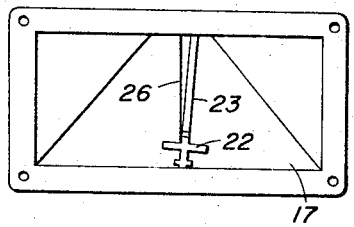
FIG. IC
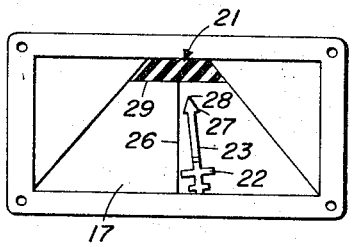
FIG. ID
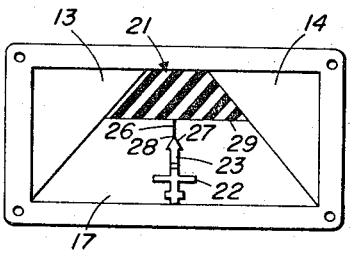
FIG. IE
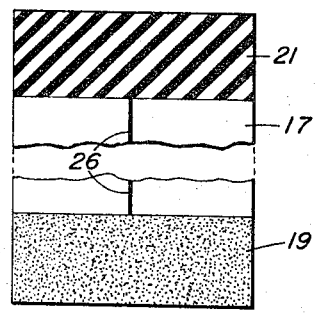
INVENTORS
HORST M. SCHWEIGHOFER
KENNETH C. EMERSON
BY
ATTORNEY United States Patent Office 3,382,351
Patented May 7, 1968

3,382,351
ROLLOUT GUIDANCE DISPLAY
Horst M. Schweighofer and Kenneth C. Emerson, Cedar Rapids, Iowa, assignors to Collins Radio Company, Cedar Rapids, Iowa, a corporation of Iowa
Filed May 11, 1967, Ser. No. 637,841
4 Claims. (Cl. 235—150.22)

ABSTRACT OF THE DISCLOSURE

An indicator which illustrates to the pilot of an aircraft the alignment with a runway and which shows the stopping point of the aircraft on the runway so that this point may be varied in accordance with the space available.

---

Figure 2:
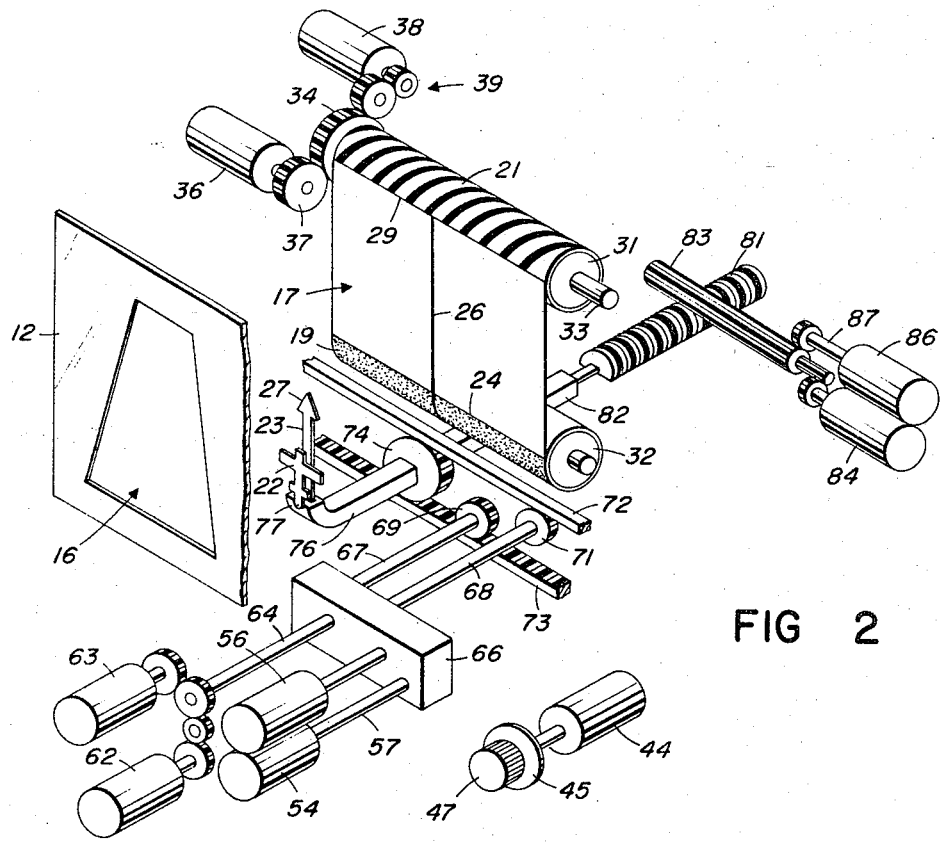

This invention relates in general to display and control systems for aircraft and in particular to a system which aids the pilot in controlling the aircraft so that it stops short of the end of the runway.

As aircraft and control systems have become more and more sophisticated, efforts have been made to continually lower the minimum visibility and ceiling allowable for operation of aircraft. As altimeters, compass systems, radio landing systems, DME's, and other advances are made in the art, it is becoming feasible to land and an aircraft under practically zero-zero visibility and ceiling conditions.

The present invention relates to a system for indicating to the pilot of an aircraft the close-in to the runway situation and the condition and parameters existing during the touchdown and rollout after touchdown. The aircraft must not contact the ground until the end of the runway has been passed and must then stay on the runway and come to a full stop before reaching the other end of the runway. Experience has shown that the condition of the runway causes wide variations in the distance and stopping forces required to stop the aircraft. For example, if the runway is wet, it becomes much slipperier than when it is dry and substantially more runway must be used in the rollout or additional braking forces must be applied to stop the aircraft.

The present invention provides the pilot with an improved indication of his aircraft's position with respect to the runway during the final stages of the approach during the touchdown and rollout and continually indicates to him the point at which the aircraft will stop on the runway if the present deceleration forces are continued. Based on this presentation, the pilot can maintain his aircraft centered upon the runway and keep his heading aligned with the runway and determine whether additional braking forces are required to safely stop the aircraft before the end of the runway is reached. It is well known that excessive decelerations result in excess wear and unpleasant decelerating forces on the passengers and pilot. Thus, a smooth rollout with a gradual stop is desirable as long as adequate runway is remaining.

It is an object of the present invention, therefore, to provide an aircraft instrument which shows the alignment of the aircraft with the runway prior to touchdown and clearly indicates the end of the runway and which after touchdown shows the opposite end of the runway and the stopping point of the aircraft based on the present deceleration forces.

A further object of the invention is to provide a safer landing system for an aircraft.

A feature of this invention is found in the provision for a generally trazoidal shaped display in which the runway is visually presented and in which the pilot may see the start of the runway as well as its far end. Indicia indicates the present position of the aircraft relative to the runway and also shows the stopping point on the runway if the present deceleration forces are maintained.

Figure 4:
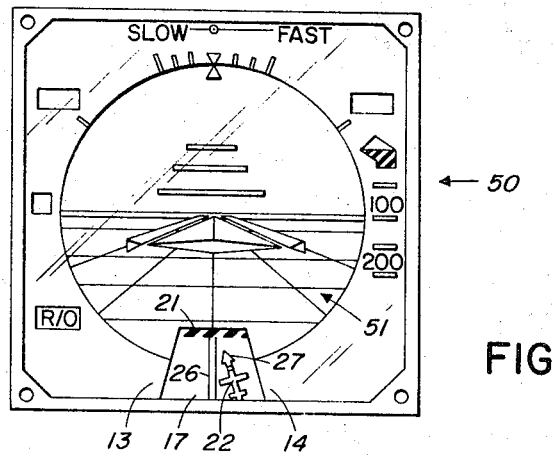
Figure 3:
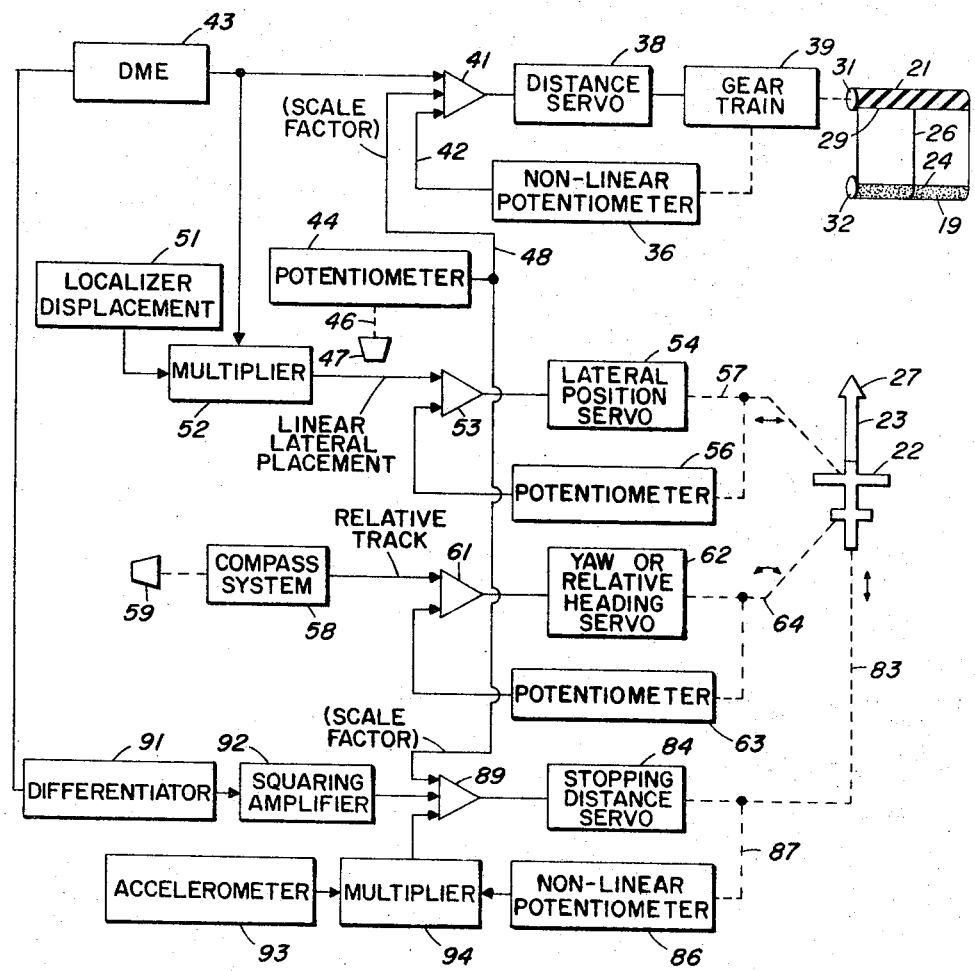

Further objects, features and advantages of this invention will become apparent from the following description and claims when read in view of the accompanying drawings, in which:

FIGURE 1A illustrates the indicator of this invention;
FIGURE 1B illustrates the indicator under different conditions;
FIGURE 1C illustrates a third situation;
FIGURE 1D illustrates a third situation;
FIGURE 1E shows the tape for the indicator;
FIGURE 2 is an exploded view illustrating the indicator of this invention;
FIGURE 3 is a block diagram of the invention showing the various sensors and inputs required to drive the device; and,
FIGURE 4 illustrates the indicator of this invention in combination with an indicator such as shown in Patent No. 3,162,834.

FIGURES 1A through 1D show the aircraft indicator of this invention under four different situations. The indicator comprises a conventional instrument case 10 which is formed with openings 11 for mounting into the instrument panel of an aircraft. The face of the instrument is covered with glass 12 and a trapezoidal mask is formed by triangular inserts 13 and 14 thus forming a trapezoidal viewing window 16 through which, a tape 17 is visible. The tape 17 is shown in FIGURE 1E and includes a first area 19 which represents the ground preceding the near end of the runway and a well marked area 21 at the upper end of the tape represents the ground beyond the far end of the runway. An aircraft indicia 22 is movable relative to the tape 17 and has an indicating arrow 23 which extends from its forward point. The length of the arrow 23 is variable in a manner to be disclosed herein. The arrow 23 and the aircraft 22 indicate the aircraft's position, heading, velocity and deceleration with respect to the runway in a manner to be described hereafter.

By observing the aircraft 22 and its associated arrow 23, the pilot may control his position relative to the runway. FIGURE 1A illustrates a situation before the aircraft has touched down and the rear end of the runway is observed to be ahead of the aircraft. The aircraft is to the left of the center line 26 of the runway as shown by the position of the arrow 23 and has a heading toward the center of the runway.

FIGURE 1B illustrates the condition where the aircraft has passed the near end of the runway 17 and is proceeding down the center line of the runway but has a heading which will take it off the center line of the runway. Since the end of the arrow 23 extends out of view under the mask, the indicator does not indicate the point on the runway on which the aircraft will stop. In the situation illustrated in 1B, the pilot should correct by making a left turn to maintain the arrow 26 in the center of the runway.

In FIGURE 1C the aircraft 22 is illustrated as being slightly to the right of the center line 26 of the runway and the head of the arrow 27 has come into view and terminates at the point 28 before the far end of the runway 29. This indicates to the pilot that if he maintains the present decelerating forces the aircraft will stop prior to reaching the end of the runway.

FIGURE 1D illustrates the aircraft on the center line of the runway and close to the arrow 27 of the indicia 23 thus indicating that the aircraft is very close to the stopping point. It is to be noted that the body of the arrow 23 varies in length as a variation of the distance to the stopping point which is indicated by the point 28 of the arrow.

Thus, in use the pilot can correct heading and position relative to the runway and may adjust his braking forces which can be controlled by flaps, wheel braking and thrust reversing to control the decelerating forces so as to stop the aircraft safely on the runway. He can do this to eliminate excessive braking forces which tend to wear the brakes and tires and are unpleasant to passengers.

The tape 17 is controlled as shown in FIGURES 2 and 3. The tape 17 is mounted on a pair of spools 31 and 32 and the spool 32 is spring loaded so as to exert tension on the tape 17. The spool 31 is mounted on a shaft 33 which also carries a gear 34, a follow-up potentiometer 36 carries a gear 37 on its output shaft which meshes with the gear 34. A motor 38 is geared to the gear 34 through a gear train 39. As shown in FIGURE 3, the motor 38 is a distance servo which receives an input from servo amplifier 41. Servo amplifier 41 also receives an input from a feedback potentiometer 36 through lead 42 and also receives an input from the DME system 43 carried on the aircraft which indicates distance to a reference relative to the runway. Another potentiometer 44 has a shaft 46 which is controlled by knob 47 and applies an input to the servo amplifier 41 through lead 48. Potentiometer 44 allows the runway length of a particular runway to be manually set into the instrument.

Thus, the DME 43 drives the tape 17 such that its appearance in the indicator corresponds to the actual view which a pilot would have if he saw the actual runway.

The other movable element is the aircraft 22 with the arrow 23. The length of the arrow 23 varies with the distance which it would take the aircraft to stop at any particular time. The aircraft and arrow also move transversely of the center line 26 and rotate relative to the center line. A localizer receiver 51 supplies an output proportional to the angular displacement of the aircraft from the center line 26 of the runway which may be converted into a linear lateral displacement by operating on the signal in a multiplier 52 which also receives an input from the DME 43. With a particular angle if the distance from the apex is known, linear lateral displacement can be calculated. Linear lateral displacement is fed to a servo amplifier 53 which supplies an input to servo motor 54. A position feedback potentiometer 56 is driven by the output shaft 57 of the lateral position servo motor and supplies an electrical input to the servo amplifier 53.

A compass system 58 has a knob 59 which is set to the alignment of the runway and produces an output proportional to the yaw or relative heading. This output is supplied to a servo amplifier 61 which also receives an input from feedback potentiometer 63 which is driven by the servo motor 62.

As best shown in FIGURE 2, the output shaft 64 of servo motor 62 and output shaft 57 of servo motor 54 supply inputs to differential 66. The differential 66 has a pair of output shafts 67 and 68 which carry gears 69 and 71. A pair of racks 72 and 73 are supported for transverse motion by gears not shown and engage a gear 74 between them. Gear 74 carries a hollow arrow-support member 76 which has a curved portion 77 adjacent its outer end to which the aircraft 22 is attached. The arrow 23 is constructed of flexible tape and extends into the hollow member 76.

The differential 66 is constructed such that inputs from motors 54 and 62 which drive shafts 67 and 68 in the same direction move the racks 72 and 73 in opposite direction and impart a rotary motion to member 76 and arrow 23. When shafts 67 and 68 rotate in opposite directions the rack gears 72 and 73 move in the same direction, thus causing the aircraft 22 and arrow 23 to be moved transversely of the indicator. It is to be realized, of course, that shafts 57 and 64 may be stationary or move independently.

The length of the arrow 23 is varied relative to the end of the member 77 such that the head of the arrow 27 and the aircraft 22 vary in distance apart. This is accomplished by attaching the end of the flexible tape 23 to a rack gear 81 which extends from the end 82 of the member 76. A gear 83 meshes with the rack gear 81 and is driven by a stopping distance motor 84. A feedback potentiometer 86 is also driven by the output shaft of the motor 84. As shown in FIGURE 3 a servo amplifier 89 supplies an input to the stopping distance servo 84. A differentiator 91 receives an input from the DME to calculate ground speed. A squaring amplifier 92 receives the output of the differentiator and produces an output proportional to the ground speed squared. The output of the squaring amplifier is fed to the servo amplifier 89. An accelerometer 93 produces a signal proportional to the deceleration of the aircraft and supplies it to a multiplier 94 which has a gain factor of two and which multiplies the input from the accelerometer and supplies it to the servo amplifier 89. A nonlinear potentiometer 86 is driven by shaft 87 and supplies an input to multiplier 94.

For constant deceleration, the required stopping distance may be calculated as:

$$s = v^2/2a$$

where $s$ = distance from present position to stopping point (feet)
$v$ = present velocity (feet/second)
$a$ = deceleration (feet/sec.$^2$)

On the display, this computed distance is represented by the same non-linear scale used to denote distance to the end of the runway, as discussed above.

The only computation required for the display is the computation of stopping distance, $s = v^2/2a$.

This can be accomplished, for example, by providing a position feedback signal "$s$" from the servomechanism 84 driving the arrow, in length, multiplying it by the quantity "$2a$," and applying this to a differential servo amplifier along with a voltage proportional to "$v^2$." When the servo is driven to null, the required equality "$v^2 = 2as$" is accomplished. The required nonlinear scale factor for the arrow length is provided by making the feedback potentiometer 86 which provides "$s$" nonlinear.

On final approach, touchdown, and initial rollout, the tip of the arrow 27 may be off-scale and out of view at the top of the display since, prior to the application of significant braking forces, the solution of the above equation will yield an infinite or very large distance. After the application of brakes, however, the arrow tip 28 will come into view to show the computed distance. After the end-of-runway symbol 21 comes into view, the arrow 27 will indicate whether the present deceleration is adequate to stop the aircraft before reaching the end of the runway, or whether additional retarding forces, such as thrust reversal, are required. On application of such forces (as detected by suitable sensors), the arrow 23 will shorten to show a new computed stopping point. Further, as the speed is reduced, the arrow will shorten accordingly, while the runway tape moves downward showing closer approach to the end. As long as the tip 28 of the arrow 27 does not extend beyond the end-of-runway line 19, the applied deceleration is adequate. Similarly, as the aircraft moves laterally across the runway, the display shows the corresponding present position of the aircraft at the bottom of the display. If the heading of the aircraft diverges from the heading of the runway, the tip 28 of the arrow may indicate that the anticipated stopping point may be off the edge of the runway, thereby calling for a heading change back toward the runway center line 26. By appropriate choice of display sensitivities, the proper amount of heading correction may be indicated as that amount which places the tip of the arrow on the tape center line 26. In this manner, the amount of heading change required will be proportional to a function of the amount of lateral displacement. Since the length 23 of the arrow is a function of speed (for constant deceleration), the amount of heading change required to place the tip of the arrow on the center line will also be inversely proportional to a function of speed, so that the amount of heading change called for will be lower at higher speeds. Assuming equal response times on the part of the pilot, this will result in less violent heading changes at higher speeds, as required for safety and passenger comfort.

When the aircraft is displaced laterally from the runway center line but traveling parallel to this line, the true pictorial view would show the arrow pointing at the vanishing point (the point where the sides of the trapezoidal mask opening would meet if extended).

This correction may be provided in the display by corresponding interaction of the lateral displacement and heading mechanisms. However, it is noted that by leaving the heading mechanism independent of the lateral displacement, the preceding condition would indicate the aircraft vector approaching (or crossing) the edge of the runway. While not pictorially accurate, this may be a desirable condition in that it serves to alert the pilot that a heading change is required to return to the runway center. The degree to which such display interaction is provided is optional, and does not alter the basic invention.

In use, the pilot tunes the DME and localizer receiver to the ground stations at the field and sets the particular runway length by knob 47 and the runway alignment by knob 59. The pilot then observes the aircraft 22 relative to the runway until the aircraft touches down. Then deceleration occurs until the aircraft stops. The pilot may observe the point of stopping by noting arrow head 27 and may adjust the point of stopping by increasing or decreasing the stopping forces. Required heading changes may also be made.

FIGURE 4 illustrates a modification to the aircraft instrument covered by Patents Number 3,162,834 and Design 194,191 by placing the indicator of this invention at the bottom portion of those instruments.

The prior instrument 50 and its various indicia are unchanged but masks 13 and 14 allow tape 17 to be visible. Aircraft 22 and arrow 27 appear over the tape. With such structure the pilot may make a transition from flight to roll along runway to stopping point.

It is seen that this invention comprises an indicator for showing the alignment of an aircraft relative to a runway and also shows the stopping point on the runway.

Although this invention has been described with respect to preferred embodiments, it is not to be so limited as changes and modifications may be made which are within the full intended scope as defined by the appended claims.

We claim:

1. An indicator for a movable craft for illustrating the craft's position relative to a reference area upon which it is desired to place the craft comprising; an indicia representative of the craft, a second indicia representative of the area upon which it is desired to place the craft and its surrounding area, the indicia of the craft superimposed upon the second indicia and movable relative thereto, and the second indicia marked with lines to indicate the beginning and ending of the desired area, a third indicia associated with the first indicia and extending from one end thereof and being of a length to indicate the distance to a stopping point on the desired area if the existing decelerating forces continue to be applied.

2. An indicator for an aircraft comprising: a first indicia representative of the aircraft movable on an instrument laterally and angularly, a second movable indicia upon which the first indicia is superimposed and marked to form areas representing either ends of a runway upon which the craft is to be landed, and means for moving the aircraft indicia and the desired area representative of the runway to show their relative positions, a third indicia extending from the indicia of the aircraft and having a length dependent upon the distance from the aircraft to the stopping point on the runway based upon the present decelerating forces.

3. In apparatus according to claim 2, means for driving said second indicia in response to the distance between the aircraft and a predetermined ground point, and means for driving said first indicia to position it relative to the indicator in accordance with the heading and lateral displacement of the aircraft with respect to the runway.

4. In apparatus according to claim 3, means for calculating distance to the stopping point of the aircraft on the runway comprising a distance measuring means, a differentiator receiving the output from the distance measuring means, an accelerometer, a distance-to-stopping point calculator receiving inputs from the distance measuring means and the accelerometer to calculate a signal proportional to the distance to the stopping point of the aircraft, and the distance to stopping point calculator connected to the third indicator to drive it.

References Cited

UNITED STATES PATENTS

| | | |
|---|---|---|
| 3,242,493 | 3/1966 | Westerback ____ 325—150.22 X |
| 3,292,176 | 12/1966 | Crane _____ 340—27 X |
| 3,305,865 | 2/1967 | Gassler _____ 343—5 |
| 3,307,191 | 2/1967 | Crane _____ 340—27 X |
| 3,324,471 | 6/1967 | Rover _____ 343—5 |
| 3,355,733 | 11/1967 | Mitchell et al. __ 235—150.22 X |

RICHARD A. FARLEY, *Primary Examiner.*

RODNEY D. BENNETT, *Examiner.*

C. L. WHITHAM, *Assistant Examiner.*